United States Patent Office 2,903,450
Patented Sept. 8, 1959

2,903,450

DYES FROM STILBENE DICARBOXYLIC ACID AMIDES

Robert S. Long, Bound Brook, and Sien M. Tsang, Middlesex, N.J., assignors to American Cyanamid Company, New York, N.Y., a corporation of Maine No Drawing. Original application December 30, 1953, Serial No. 401,376. Divided and this application December 16, 1957, Serial No. 702,769

4 Claims. (Cl. 260—240)

This invention relates to new dyes and, more specifically, it relates to new vat dyes of the structure:

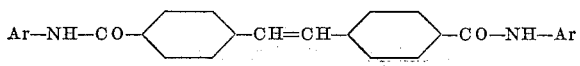

in which Ar is a vattable organic radical. More specifically, Ar may be (1) a vattable organic radical such as anthraquinone, substituted anthraquinones, dianthrimides, anthraquinone acridones, dibenzanthrones, anthrapyrimidones, pyrazoleanthrones, and the like.

Acylamino derivatives of anthraquinones have been used as dyes in the past. Like most simple anthraquinone compounds they have a low substantivity to fibers. We have found that stilbene dicarboxylic acid forms amides with aminoanthraquinones and other vattable residues that are not only substantive but have good fastness properties. The anthraquinones which can be used include 1-aminoanthraquinone, 2-aminoanthraquinone and their alkyl and halogen derivatives; 1,4-diaminoanthraquinone, 1,5 - diaminoanthraquinone, 1,8 - diaminoanthraquinone, 2,6-diaminoanthraquinone, and their alkyl and halogen derivatives; 4-aminoanthraquinone-1(N), 2-benzacridone and its halogen and alkyl derivatives; 4-amino-1, 1'-dianthrimide-2,2'-carbazole, 5 - amino-1,1'-dianthrimide-2,2'-carbazole, amino dibenzathrone, 4-amino-1,9-anthrapyrimidone, 4-amino-1,9-pyrazolanthrone, 4-amino-1,9-isothiozoloanthrone and the like.

The stilbene dicarboxylic acid amides can be prepared by a variety of conventional methods. Thus, the stilbene dicarboxylic acid may be converted to the di-acid chloride by the use of phosphorus trichloride, phosphorus pentachloride, phosphorus oxychloride, thionyl chloride, or a similar agent. The acid chloride may then be reacted with two moles of the amine in the presence of an inert solvent if necessary. A convenient method is to heat the dicarboxylic acid in an excess of thionyl chloride under reflux, to distill off the excess reagent, and to treat the acid chloride with the amine in pyridine at the boil. Still better, the dicarboxylic acid is reacted with only the theoretical amount of thionyl chloride by gently warming in pyridine, and the amine is then added directly to the reaction mixture, which is then heated at the boiling point. An alternative method whereby one may isolate the acid chloride in pure form is to heat the dicarboxylic acid with the theoretical amount of thionyl chloride in an indifferent medium such as nitrobenzene; the acid chloride precipitates out and may be filtered off; it is then reacted with the amine as before.

This application is a division of our copending application, Serial No. 401,376, filed December 30, 1953.

Our invention can be illustrated by the following examples, in which parts are by weight unless otherwise specified.

Example 1

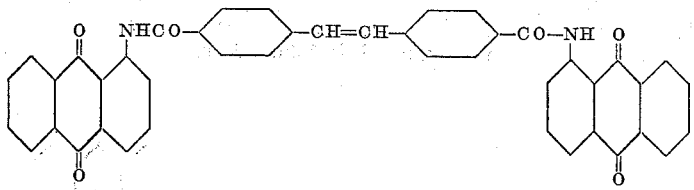

2.7 parts of 4,4'-stilbene dicarbonyl chloride and 4.0 parts of 1-aminoanthraquinone are introduced into 72 parts of nitrobenzene and the mass is stirred while being gradually heated to 140° C. It is then held at 140–150° C. until the reaction is substantially complete after which the slurry is cooled. The product is isolated by filtration and washing with nitrobenzene and alcohol. The dye is obtained as an orange-yellow powder which dyes cotton bright golden yellow shades from a dull violet vat. It dissolves in concentrated $H_2SO_4$ with an orange-brown color.

Equivalent amounts of 2-aminoanthraquinone, 4-amino-1,1'-dianthrimide-2,2'-carbazole, 4-amino-1,9-anthrapyrimidone, 4-amino-1,9-pyrazolanthrone, or 4-amino-1,9-isothiazoloanthrone can be susbtituted for the aminoanthraquinone to give new vat dyes.

Example 2

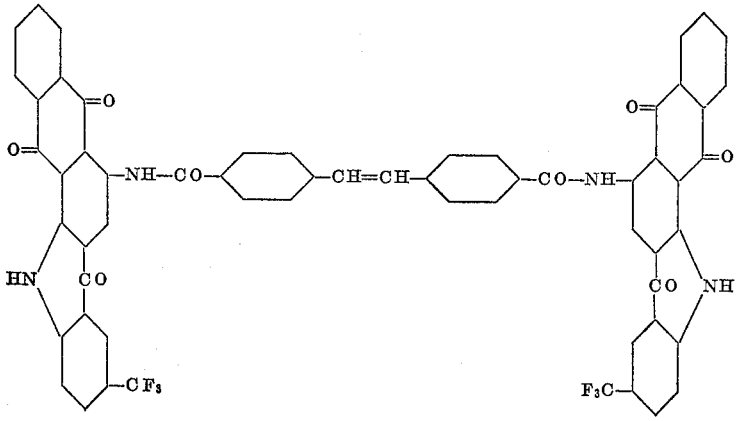

The procedure of Example 1 is followed, using an equivalent quantity of 5'-trifluoromethyl-4-aminoanthraquinone-1(N)-2-benzacridone in place of the 1-aminoanthraquinone. The product is a blue powder which dyes cotton a blue shade of good properties.

*Example 3*

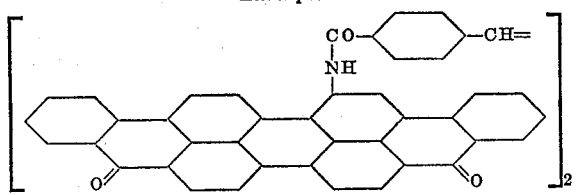

The procedure of Example 2 is followed, using an equivalent amount of aminodibenzenzanthrone in place of the aminoanthraquinone. The product so obtained is a green blue solid which dyes cotton fast green blue shades.

We claim:
1. Compounds having the formula:

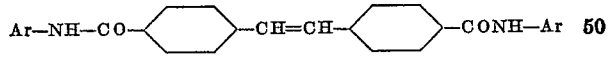

in which Ar is a vattable organic residue selected from the group consisting of anthraquinone, anthraquinone metatrifluoromethyl benzacridone, dianthramide carbazole, anthrapyrimidone, pyrazolanthrone and isothiazoloanthrone.

2. A compound having the formula:

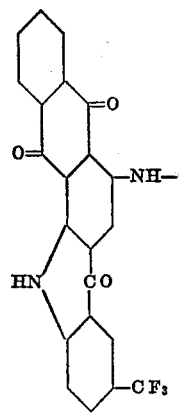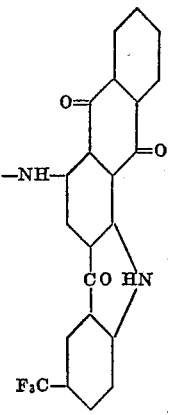

3. A compound having the formula:

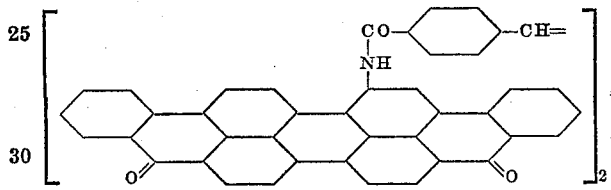

4. A compound having the formula:

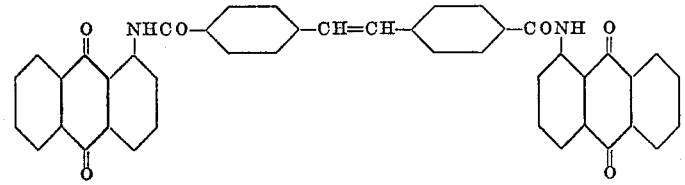

References Cited in the file of this patent

Lubs: Chemistry of Synthetic Dyes and Pigments, ACS Monograph No. 127, pp. 440–441, Reinhold Publishing Corporation, 1955.